United States Patent Office 3,124,333
Patented Mar. 10, 1964

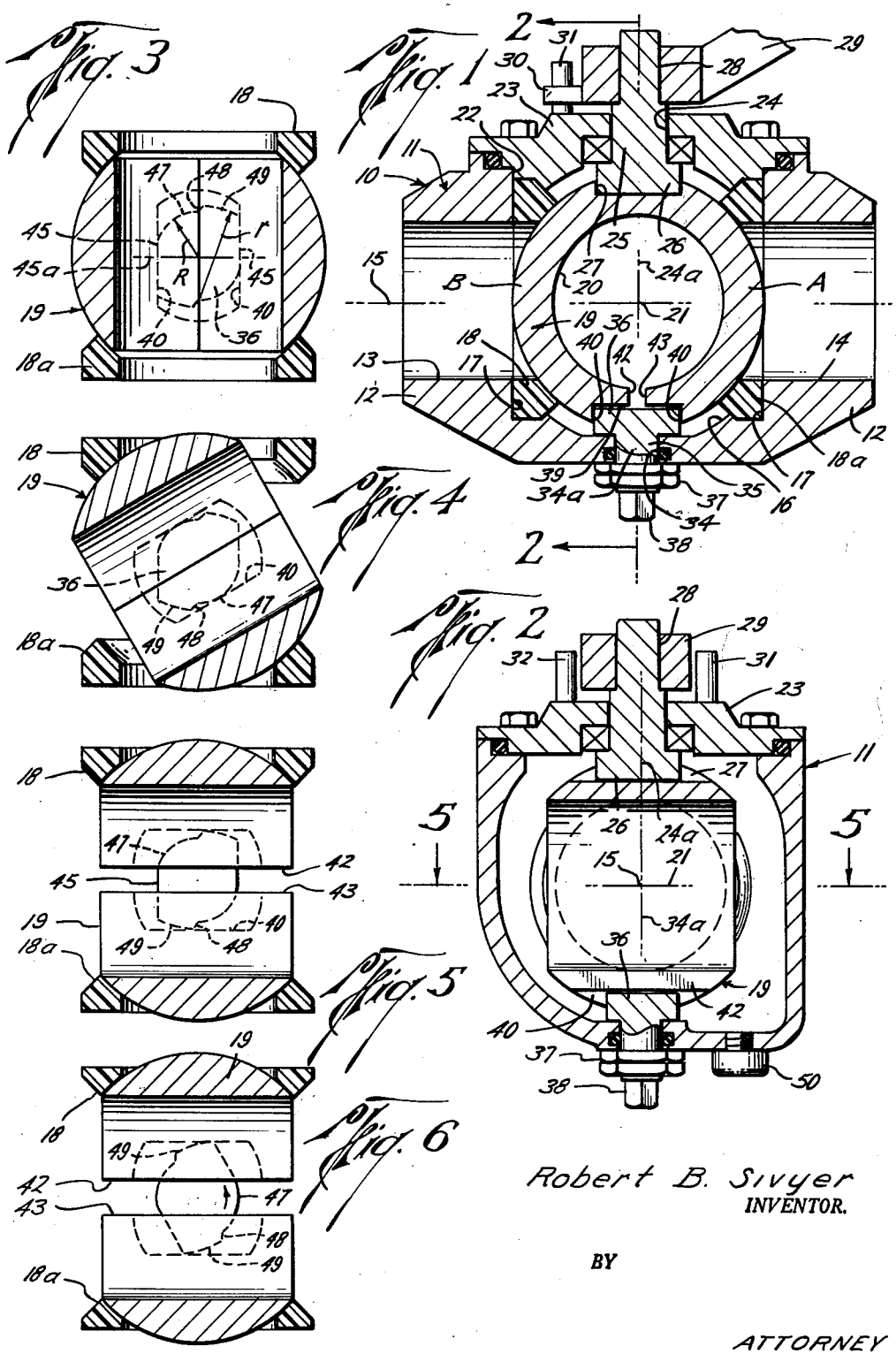

3,124,333
SPLIT BALL VALVES HAVING CAM SEALING INCREASING MEANS
Robert B. Sivyer, 1314 Beutel Drive, Houston, Tex.
Filed Apr. 24, 1961, Ser. No. 105,146
8 Claims. (Cl. 251—161)

This invention relates to ball valves, and more particularly, to improved means for pressure sealing a ball valve for high temperature, high pressure applications.

Heretofore, ball valves have relied upon resilient sealing members disposed in the passageway through the valve body to provide a fluid tight seal with the ball member when the valve is in a closed position. Under high temperature and pressure conditions, the resilient sealing members have a tendency to leak. After repeated operations of the valve over a period of time the leakage problem is particularly prevalent. In an effort to overcome the leakage problem thus encountered under severe conditions of operation, complicated mechanical structures have evolved wherein one of the sealing members is subjected to mechanically compression by an independently operated device to provide an addition sealing pressure while the valve is in a closed position.

Accordingly, it is an object of the present invention to provide new and improved means for mechanically compressing the pressure seals in a ball valve in a simple and inexpensive manner to provide a positive fluid tight seal in a closed position of the valve.

Another object of the present invention is to provide a new and improved ball valve wherein the ball member is mechanically moved to mechanically compress the sealing members relative to the valve body in a closed position of the valve.

A still further object of the present invention is to provide a new and improved ball valve which is operable over a long period of time in high temperature and pressure applications.

Apparatus in accordance with the present invention includes a ball valve body member provided with a ball closure member. The ball closure member has the normal opening therethrough for providing a fluid communication path between the passageways in the valve body in an open position of the valve. Sealing elements are disposed between the ball member and body member to provide a pressure seal when the valve is in a closed position. The ball closure member is split and includes shoulders thereon which are engageable with a cam member in the valve body. Thus, when the ball member is rotated relative to the cam member, the ball member is cammed apart and when the ball member is in a closed position the cammed movement of the ball member provides for mechanical compression of the sealing elements. Means can further be provided for adjusting the cam to vary the degree of mechanical compression for the sealing elements over a wide range of operation.

The novel features of the present invention are set forth with particularity in the appended claims. The present invention, both as to its organization and manner of operation, together wth further objects and advantages thereof, may best be understood by way of illustration and example of certain embodiments when taken in conjunction with the accompanying drawing in which:

FIG. 1 is a view in cross-section through a valve embodying the present invention, the valve being shown in a closed position;

FIG. 2 is a view in cross-section taken along line 2—2 of FIG. 1;

FIGS. 3–5 are schematic views of the relationship between the ball, the sealing elements and the device for providing mechanical compression of the sealing element. The views are taken generally along line 5—5 of FIG. 2 and respectively illustrate an open, a partially closed and a fully closed position of the ball relative to the sealing element; and FIG. 6 is a schematic view similar to the views of FIGS. 3–5 and further illustrating another operational position of the device for altering the mechanical compression of the sealing elements when the ball is in a closed position relative to the sealing elements.

Referring now to FIG. 1, the illustrated ball valve 10 has a hollow valve body 11 with outlet connections 12 which, for example, may be cylindrically shaped for connection in a pipe system. Outlets 12 are provided with cylindrical passageways 13 and 14 disposed along a common axis 15. Passageways 13 and 14 open into a central hollow interior or valve chamber 16 of the valve body 10 which contains a ball member 19. The hollow interior 16 in the valve body 11 has machined seating surfaces 17 about each of the openings 13 and 14 upon which annular sealing elements or valve seats 18, 18a are mounted. Disposed between the sealing elements 18, 18a is the spherically shaped ball closure member 19. Ball member 19 has a cylindrical opening 20 comparable in size to the size of passageways 13 and 14 and has an axis 21 which generally aligns with axis 15 of the openings 13, 14 in an open position of the valve. The ball member 19 and sealing members 18, 18a are received into the interior 16 through an upper access opening 22 in the valve body 11. A cap member 23 is sealingly secured to the valve body 11 and has a cylindrical opening 24 through which a stem 25 passes. The axis 24a of opening 24 intersects the axis 21 of the ball member 19 and stem 25 is coupled to the ball member 19 by means of a square shaped shank 26 which is received in a slot 27 in the ball member 19. The portion of stem 25 disposed on the exterior of the cap member 23 has a square shaped shank 28 sized for reception in a square shaped socket of a turning wrench 29. Wrench 29 has an extension 30 which is arranged to abut with stops 31 and 32 (FIG. 2) on cap member 23 where the stops respectively serve to limit the rotation of the stem 25 and ball 19 between the open and closed positions of the valve. It will, of course be appreciated that the ball member 19 and stem 25 can be a one piece construction if so desired.

The valve body 11 has an opening 34 disposed in the lower part of the valve body, the opening 34 having an axis 34a perpendicular to axes 15 and aligned with the axis 24a of opening 24 in the cap member 23. Sealingly passed through the opening 34 is a shaft 35 which carries a cam member 36, the cam member 36 being disposed within the hollow interior 11 of the valve body. Shaft 35 and cam 36 are held in a normally fixed position by means of lock nuts 37 attached to the shaft 35 and bearing upon the exterior of the valve body 11. Shaft 35 has a depending extension 38 extending beyond the lock nuts 37 which is square shaped for receiving a wrench (not shown) similar to wrench 29. Cam member 36 is received within a slot 39 in the ball member 19 where the slot 39 has substantially parallel shoulders 40. Shoulders 40 of slot 39 are aligned to lie in planes equidistantly spaced to either side of a central plane formed by the intersecting axes 34a and 21. Ball member 19 is split along the aforesaid central plane between the bottom surface of slot 39 and the opening 20 to form split sections A and B. The split sections A and B of ball member 19 have normally contacting surfaces 42 and 43 coextensive with the aforesaid plane. It will be appreciated that the split sections A and B of the ball member tend to resist movement of surfaces 42 and 43 away from one another so that the sections provide a restoring force when the sections are separated.

In operation, as the ball member 19 is rotated from an open position to a closed position, cam member 36 urges the surfaces 42 and 43 of the split sections A and B away from one another and, as the split sections A and B of the ball member 19 are moved away from one another, each of the sealing elements 18 is mechanically compressed by equally applied pressures of the split sections of the ball member. The ball member, of course may slightly shift in the valve body to adjust its surfaces relative to the sealing elements 18, 18a.

While various cam configurations may be found suitable, cam 36 as shown in dashed lines in FIGS. 3–5 includes parallel edge surfaces 45 spaced apart a distance complimentary to the spacing between the parallel shoulders 40 of the slot 39 when the surfaces 42, 43 of the ball sections A and B are in contact with one another (the valve is in an open position). The sections of the cam member 36 to either side of a perpendicular 45a to the edge surfaces 45 are similarly shaped so that a description of one section will suffice for the other.

Using the perpendicular 45a as a reference, a first curved surface 47 with a given radius R originates at an angle of 60° clockwise to the reference perpendicular 45a and terminates at an angle of 90° relative to the reference. At an angle of 90° from the perpendicular 45a, the cam member 36 has an inclined shoulder 48 formed between the first curved surface 47 and a second curved surface 49 which extends between the angle of 90° to 120°. The second curved surface 49 has a radius $r$ with a center lying on an oppositely disposed curved surface 47 an angle of 90° from the perpendicular 45a. This stepped shoulder 48 on the surface of the cam 36 between the curved surfaces 47 and 49 permits the closing of the valve at 90° to be accentuated by the sudden increase in wrench torque necessary to close the valve. In particular, as shown in FIG. 4, when the ball member 19 has been turned through an angle of 60° from the open position towards a closed position, the cam shoulder 48 engages a shoulder 40 on the ball member and further turning of the ball member permits the cam 36 to spread the sections A and B of the ball member away from one another as shown in FIG. 1. Hence the cam member urges the split ball member to mechanically compress each of the sealing elements to distribute the compressive forces fairly uniformly to each sealing element.

After a period of time, should the seal elements wear or permit leakage, the cam member 36 can be further rotated while the ball member 19 is held in a closed position. Rotation of the cam member 36 as shown in FIG. 6, permits the surface 49 (which contiuously increases radially) to further increase the mechanical compression of the seal elements by the additional movement of shoulders 40 away from one another. It will also be appreciated that rotation of the cam member 36 in a reverse direction also permits the ball sections A and B to spring back to their initial position so that the ball member may be easily rotated. Thus, there is no possibility of sticking the ball member in a closed position since all pressure on sealing element can be removed while the ball member is in the closed position.

As shown in FIG. 2, valve body 11 can be provided with a bleeder valve 50 so that the effective seating of the valve can readily be determined by merely opening the valve 50 while the valve 10 is in a closed position. Also, for high temperature applications the sealing elements are preferably made of suitable heat resisting materials.

From the foregoing it will be appreciated that the present invention deals with a ball valve in which a cam and ball member cooperate such that the size of the ball member is effectively increased while in the closed position of the valve to provide mechanical compression of the sealing elements. For this purpose it is conceivable that the ball member 19 may be bipartite with an outer split shell and an inner tubular core and hence the split in the ball member need only be adequate to permit expansion of the size of the ball member.

While a particular embodiment of the present invention has been shown and described, it is apparent that changes and modifications may be made without departing from this invention in its broader aspects and therefore, the aim in the appended claims is to cover all such changes and modifications as fall within the true spirit and scope of this invention.

What is claimed is:

1. A ball valve comprising a valve body having a hollow interior and passageways opening to said hollow interior, an integral ball member received in said hollow interior and having a passageway therethrough for completing fluid communication between said passageways in one rotative position of said ball member in said valve body, sealing elements disposed about said passageways between said ball member and said valve body, said sealing elements being sized to cooperate with said ball member to close off the opening of the passageways to the hollow interior when said ball member is in another rotative position relative to the valve body, a stem coupled to said ball member to rotate the same, said ball member having a single split extending between said ball member passageway and the exterior of said ball member at a diametrical location from said stem, said ball member further having cam follower surfaces respectively disposed to each side of said split, a cam member in said valve body engageable by said cam follower surfaces in said other rotative position to urge the surfaces defined by said split away from one another thereby to mechanically compress said sealing elements.

2. A ball valve comprising a valve body having a hollow interior and passageways opening to said hollow interior, an integral ball member received in said hollow interior and having a passageway therethrough for completing fluid communication between said passageways in one rotative position of said ball member in said valve body, sealing elements disposed about said passageways between said ball member and said valve body, said sealing elements being sized to cooperate with said ball member to close off the opening of the passageways to the hollow interior when said ball member is in another rotative position relative to the valve body, said rotative positions being at 90° from one another, a stem coupled to said ball member to rotate the same said ball member having a single split extending between said ball member passageway and the exterior of said ball member at a diametrical location from said stem, said ball member further having cam follower surfaces respectively disposed to each side of said split, a cam member in said valve body engageable by said follower surfaces in said other rotative position to urge the surfaces defined by said split away from one another thereby to mechanically compress said sealing element.

3. A ball valve comprising a valve body having a hollow interior and passageways opening to said hollow interior, an integral ball member received in said hollow interior and having a passageway therethrough for completing fluid communication between said passageways in one rotative position of said ball member in said valve body, sealing elements disposed about said passageways between said ball member and said valve body, said sealing elements being sized to cooperate with said ball member to close off the opening of the passageways to the hollow interior when said ball member is in another rotative position relative to the valve body, a stem coupled to said ball member to rotate the same said ball member having a single split extending between said ball member passageway and the exterior of said ball member at a diametrical location from said stem, said ball member further having cam follower surfaces respectively disposed to each side of said split, a cam member in said valve body engageable with said cam follower surfaces in said other rotative position to urge the surfaces defined by said split away from one another thereby to mechanically compress said sealing elements, and means for permitting rotation of said cam member relative to said ball member while said ball member is in said other position, said cam being shaped so as to increase the mechanical compression on said sealing elements upon rotation of said cam member.

4. A ball valve comprising a valve body having a hollow interior and passageways opening to said hollow interior, an integral ball member received in said hollow interior and having a passageway therethrough for completing fluid communication between said passageways in one rotative position of said ball member in said valve body, sealing elements disposed about said passageways between said ball member and said valve body, said sealing elements being sized to cooperate with said ball member to close off the opening of the passageways to the hollow interior when said ball member is in another rotative position relative to the valve body, a stem coupled to said ball member to rotate the same said ball member having a single split extending between said ball member passageway and the exterior of said ball member at a diametrical location from said stem, said ball member further having cam follower surfaces respectively disposed to each side of said split, a cam member in said valve body engageable with said cam follower surfaces in said other rotative position to urge the surfaces defined by said split away from one another thereby to mechanically compress said sealing elements, and means for permitting rotation of said cam member relative to said ball member while said ball member is in said other position, said cam being shaped so as to increase or release the mechanical compression of said sealing elements dependent upon the direction of rotation of said cam member.

5. A ball valve comprising a valve body having a hollow interior and passageways opening to said hollow interior, an integral ball member received in said hollow interior and having a passageway therethrough for completing fluid communication between said passageways in one rotative position of said ball member in said valve body, sealing elements disposed about said passageways between said ball member and said valve body, said sealing elements being sized to cooperate with said ball member to close off the opening of the passageways to the hollow interior when said ball member is in another rotative position relative to the valve body, a stem coupled to said ball member to rotate the same, said ball member being spherically shaped with a slot in its outer surface extending parallel to the passageway through said ball member, said ball member having a single split extending between said ball member passageway and the exterior of said ball member along a line bisecting said slot and at a diametrical location from said stem, a cam member in said valve body for engagement in said slot, said cam member being shaped to separate the portions of said ball member to either side of said split when said ball member is in said other rotative position.

6. A ball valve comprising a valve body having a hollow interior and passageways opening to said hollow interior; valve seats in said body about said passageway openings; an integral ball valve member having an opening therethrough; means mounting said ball member in said valve body for rotative movement between open and closed positions of said ball valve opening relative to said valve seats, said mounting means including a turning stem coupled to said ball member, a slot in the exterior of said ball member located diametrically opposite to said stem, and a cam member received by said slot; said ball member having a normally closed split extending between said slot and said ball member opening when said ball member is in an open position in said valve body, said cam member having a configuration shaped for cooperation with said slot to separate said ball member at said split and urge said ball member into sealing engagement with said valve seats when the ball member is rotated between open and closed positions, the resiliency of said ball member returning said split to its closed condition when said ball member is rotated between closed and open positions.

7. A ball valve comprising a valve body having a hollow interior and passageways opening to said hollow interior, a ball member received in said hollow interior and having a passageway therethrough for completing fluid communication between said passageways in one rotative position of said ball member in said valve body, valve seats in said body about said passageways to cooperate with said ball member to close off the opening of the passageways to said hollow interior when said ball member is in another rotative position relative to the valve body, said ball member being spherically shaped with a slot in its outer surface extending parallel to the passageway through said ball member, a turning stem attached to said ball member at a diametrical location from said slot, said ball member having a single split along a line bisecting said slot, a cam member in said valve body in engagement with said slot, said cam member being shaped to separate the portions of said ball member to either side of said split when said ball member is in said other rotative position.

8. The apparatus of claim 6 and further including means connected to said cam member to permit rotation of said cam member independently of the rotation of said ball valve member, said cam member configuration further including surfaces to further increase the separation of said ball member when said ball member is in sealing engagement with said valve seats.

References Cited in the file of this patent

UNITED STATES PATENTS

| | | |
|---|---|---|
| 1,941,839 | Johansson | Jan. 2, 1934 |
| 2,027,108 | Kuehling | Jan. 7, 1936 |
| 2,200,474 | Heggem | May 14, 1940 |
| 2,277,975 | Heggem | Mar. 31, 1942 |
| 2,373,628 | Gleeson | Apr. 10, 1945 |
| 2,488,932 | Penick | Nov. 22, 1949 |
| 2,895,710 | Sanctuary | July 21, 1959 |

FOREIGN PATENTS

| | | |
|---|---|---|
| 1,117,061 | France | Feb. 13, 1956 |